United States Patent [19]
Bloemer et al.

[11] Patent Number: 6,085,954
[45] Date of Patent: Jul. 11, 2000

[54] PIVOTING EXTENSIBLE REAR HITCH ATTACHMENT FOR EQUIPMENT CARRIER

[75] Inventors: John M. Bloemer, Sun Prairie; Clarence A. Anderson, Middleton, both of Wis.

[73] Assignee: Graber Products, Inc., Madison, Wis.

[21] Appl. No.: 09/115,979

[22] Filed: Jul. 15, 1998

[51] Int. Cl.[7] .................................................. B60R 9/00
[52] U.S. Cl. .................... 224/509; 224/502; 224/519; 224/532; 224/924
[58] Field of Search ...................... 224/521, 509, 224/496, 503, 504, 508, 511, 518, 519, 520, 523, 529, 530, 531, 532, 502, 488

[56] References Cited

U.S. PATENT DOCUMENTS

| | | |
|---|---|---|
| 995,771 | 6/1911 | Coyle . |
| 1,135,517 | 4/1915 | Goss . |
| 1,860,920 | 5/1932 | Barker . |
| 1,886,911 | 11/1932 | Schulman . |
| 1,912,958 | 6/1933 | Widener . |
| 1,979,809 | 11/1934 | Newton . |
| 3,202,332 | 8/1965 | Walker . |
| 3,350,065 | 10/1967 | Mankey . |
| 3,529,737 | 9/1970 | Daugherty . |
| 4,976,386 | 12/1990 | Geiger . |
| 5,094,373 | 3/1992 | Lovci . |
| 5,114,120 | 5/1992 | Bartelt et al. . |
| 5,454,496 | 10/1995 | Sumida et al. . |
| 5,518,159 | 5/1996 | DeGuevara . |
| 5,586,702 | 12/1996 | Sadler . |
| 5,626,059 | 5/1997 | Bobbitt, III et al. . |
| 5,664,717 | 9/1997 | Joder . |
| 5,884,826 | 3/1999 | Shaver ................................ 224/509 |

*Primary Examiner*—Gregory M. Vidovich
*Assistant Examiner*—Maerena W. Brevard
*Attorney, Agent, or Firm*—Lathrop & Clark LLP

[57] ABSTRACT

An equipment rack incorporating four linked members which mount an equipment rack support to a hitch insert. The linked members are formed by two pairs of pivotally linked arms which in turn are pivotally linked to the hitch insert and to an equipment rack mounting bracket. Each pair of linked arms provides three pivot bearings which have mutually parallel axes. In the collapsed position the linked arms making up each pair are parallel and the equipment rack support and hitch insert are in juxtaposition. In the extended position the arms making up each pair are substantially co-linear. A mechanical link locks the rack support to the hitch insert when the rack is retracted against the rear of the vehicle.

20 Claims, 5 Drawing Sheets

PIVOTING EXTENSIBLE REAR HITCH ATTACHMENT FOR EQUIPMENT CARRIER

FIELD OF THE INVENTION

The present invention relates to bicycle racks and other equipment carriers which mount to a trailer hitch at the rear of a vehicle.

BACKGROUND OF THE INVENTION

The development of equipment racks, particularly bike racks which mount bikes or other recreational equipment to the exterior of an automobile has undergone a number of evolutionary steps. There are in general three general types of racks: roof racks, trunk racks, and hitch racks. Recently hitch racks, that is equipment carriers that mount to a trailer hitch at the rear of a vehicle, have become more popular. This popularity is related to the rise of the sport utility vehicle and the wide use of trucks for urban passenger vehicles. Whereas in the past a trailer hitch was a fairly specialized item normally only purchased by those with a trailer to pull, now a wide variety of vehicles come with trailer hitches as standard equipment or as part of a package of options.

A rack which attaches to a trailer hitch has many advantages. A trailer hitch provides a standard interface designed to support substantial loads. Installing and removing a rack from a trailer hitch is normally simpler then mounting a carrier directly to a vehicle. A stronger equipment rack, capable of carrying a larger number of bikes or other equipment, is more easily accommodated by a rack mounted to a hitch which is designed to support substantial hitch loads. The rack is also located at the rear of the vehicle where aerodynamic drag is not affected by the presence of additional equipment by virtue of being positioned in the turbulent wake region behind a vehicle.

One problem with a rack or cargo carrier which mounts to a trailer hitch at the rear of a vehicle is that the rack may prevent access to the rear door of the vehicle. Although some racks may be designed to pivot away from the rear door, if the rack is supporting a substantial weight in equipment, the bikes or other cargo must be unloaded before the cargo rack is tilted to gain access to the rear of the vehicle. Several existing devices have employed springs or gas shock to balance the weight of equipment particularly bikes, to allow the loaded rack to be pivoted downwardly away from the rear door. However if the rack is unloaded it now becomes difficult to pivot because the force of the spring or gas shock must be overcome. In some circumstances considerable force must be exerted on the rack at the same time that a latch or release must be actuated. This results in needing a combination of strength and dexterity to move the rack towards or away from its carrying position behind the vehicle.

The usefulness of a cargo rack increases as the simplicity and ease of use increases. Potential purchasers of cargo racks for use with trailer hitch mounts behind vehicles are typically concerned not only with simplicity and ease of use but cost and durability.

What is needed is a mechanism for mounting an equipment rack to a trailer hitch which provides access to the rear of the vehicle and in which movement of the rack is not significantly affected by whether the rack is supporting equipment or is empty.

SUMMARY OF THE INVENTION

The equipment rack of this invention incorporates four linked members which mount an equipment rack support to a hitch insert. The linked members are formed by two pairs of pivotally linked arms which in turn are pivotally linked to the hitch insert and to an equipment rack mounting bracket. Each pair of linked arms provides three pivot bearings which have mutually parallel axes, the entire rack mechanism thus incorporates six pivot axes. The individual arms are constructed of torsionally stiff members. In the collapsed position the linked arms making up each pair are parallel and the equipment rack support and hitch insert are in juxtaposition. In the rearwardly extended position the arms making up each pair are substantially co-linear. As the equipment rack rotates to one side of the vehicle the arms assumed a bend but extended configuration. The equipment rack support and hitch insert are separated by a distance approximately equal to twice the length of an individual arm.

Each pivot bearing which attaches an arm to the rack support or the hitch insert is formed between structural extensions from the arms which overlie the arms and the rack support or hitch insert. These structural extensions prevent interference between the arms and the hitch insert and rack support when the arms pivot with respect to them. Similarly structural extensions extend from one of each pair of arms and overlie the connected arms to allow the arms to pivot without interference. For greater rigidity between the rack support and the hitch insert a mechanical link which locks the rack support to the hitch insert is provided when the linked members position the rack support and hitch insert in juxtaposition. Maximum rigidity is only required while the vehicle is in actual motion and the rack is retracted against the rear of the vehicle.

It is an object of the present invention to provide a mechanism for mounting an equipment rack to a vehicle trailer hitch which allows access to the rear door of the vehicle.

It is a further object of the present invention to provide a means for moving a loaded or empty rack away from the rear of a vehicle to gain access to the rear of the vehicle without the necessity of applying significant force.

Further objects, features and advantages of the invention will be apparent from the following detailed description when taken in conjunction with the accompanying drawings.

DESCRIPTION OF THE PREFERRED EMBODIMENTS

Figure 5:
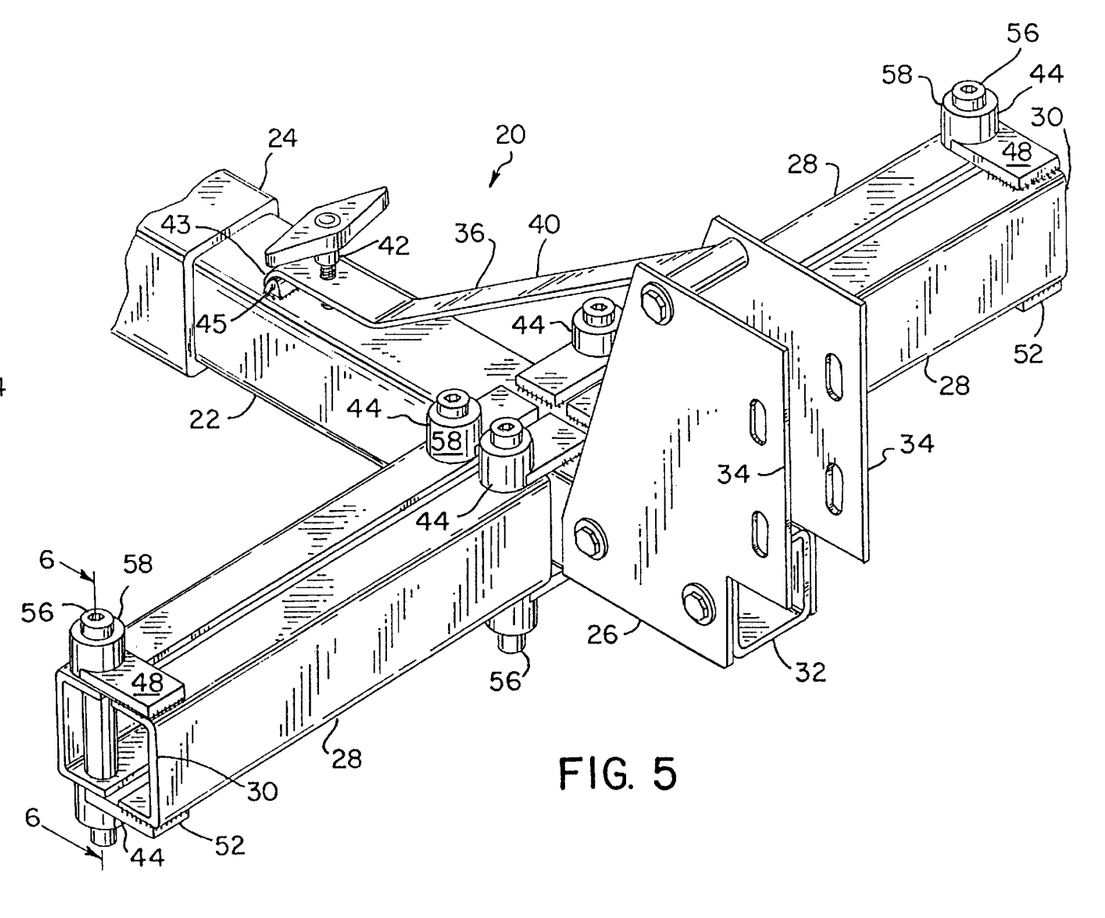
FIG. 5 is an isometric view of an alternative embodiment of the rack extending mechanism of this invention.

Referring more particularly to FIGS. 1–8 wherein like numbers refer to similar parts a bike rack extension mechanism 20 is shown in FIG. 5. The rack extension mechanism 20 is composed of a hitch mounting bracket 22 which has a square cross-section tube 38 and which is received in a trailer hitch 24, and a rack mounting bracket 26 joined by four linked arms 28. Two of the arms 28 are pivotally linked to form two linked pairs 30. The linked pairs of arms 30 are pivotally connected at either end between the hitch mounting bracket 22 and the rack mounting bracket 26.

The rack mounting bracket 26 incorporates a square tube section 32 and a pair of upstanding flanges 34 to which an equipment carrying rack may be connected. A strap 36 connects the upstanding flanges 34 to the square tube section 38 of the hitch mounting bracket 22. The strap 36 forms a lock 40 which, by means of a bolt 42, connects the strap 36 to the hitch mounting bracket 22 when the hitch mounting bracket 22 and the rack mounting bracket 26 are in juxtaposition. The lock 40 has two conditions, the first where the lip 43 of the strap 36 engages an interlocking projection 45 on the hitch mounting bracket 22. The second is when the bolt 42 engages threads in the mounting bracket 22 securely joining strap 36 to the mounting bracket 22. The arms 28 are formed of structural steel C-channels in order to provide torsional and bending stiffness to support the weight of bikes or other equipment which is mounted to the rack mounting bracket 26.

Figure 6:
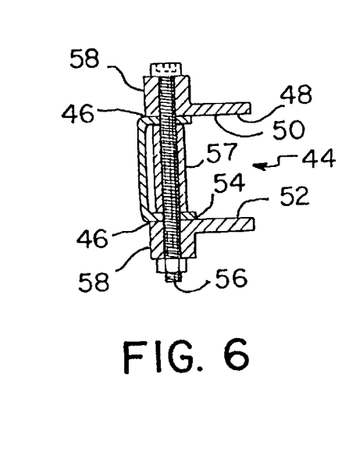
FIG. 6 is a cross-sectional view of the rack extending mechanism of FIG. 5 taken along section line 6—6.

Bearing mechanisms 44, best shown in FIG. 6, provide for rotation of the arms 28 with respect to each other and the hitch mounting bracket 22 and the rack mounting bracket 26. Each bearing mechanism 44 incorporates two bearings 46 formed between upper bearing extension plates 48 and upper surfaces 50 of the C-channel and lower bearing plates 52 and lower surfaces 54 of the C-channel. The vertically arrayed bearings 46 form a bearing axis coincident with the bearing bolt 56 which joins the arms 28 to each other and the hitch mounting bracket 22 and the rack mounting bracket 26. Bolt sleeves 57 prevent localized crushing or excessive loading of the C-section, thus preventing the upper surfaces 50 from being forced by tightening of the nuts 59 toward the lower surfaces 54.

The spaced apart bearings 46 form stiff mechanical joints which, in combination with the structural section making up the arms 28, provide the structural strength to support a substantial load of up to several hundred pounds. The stiffness of a structural element in bending is a combination of its sectional modulus and the length of the element and how it is supported. The overall stiffness of the arms 28 and the bearings 46 is accomplished by a combination of using a stiff structural cross-section to form the arms and short extensions formed by bearing plates 48 which are rigidly mounted to one arm 28 and have structural bosses 58 which reinforce the bearings 46.

Figure 1:
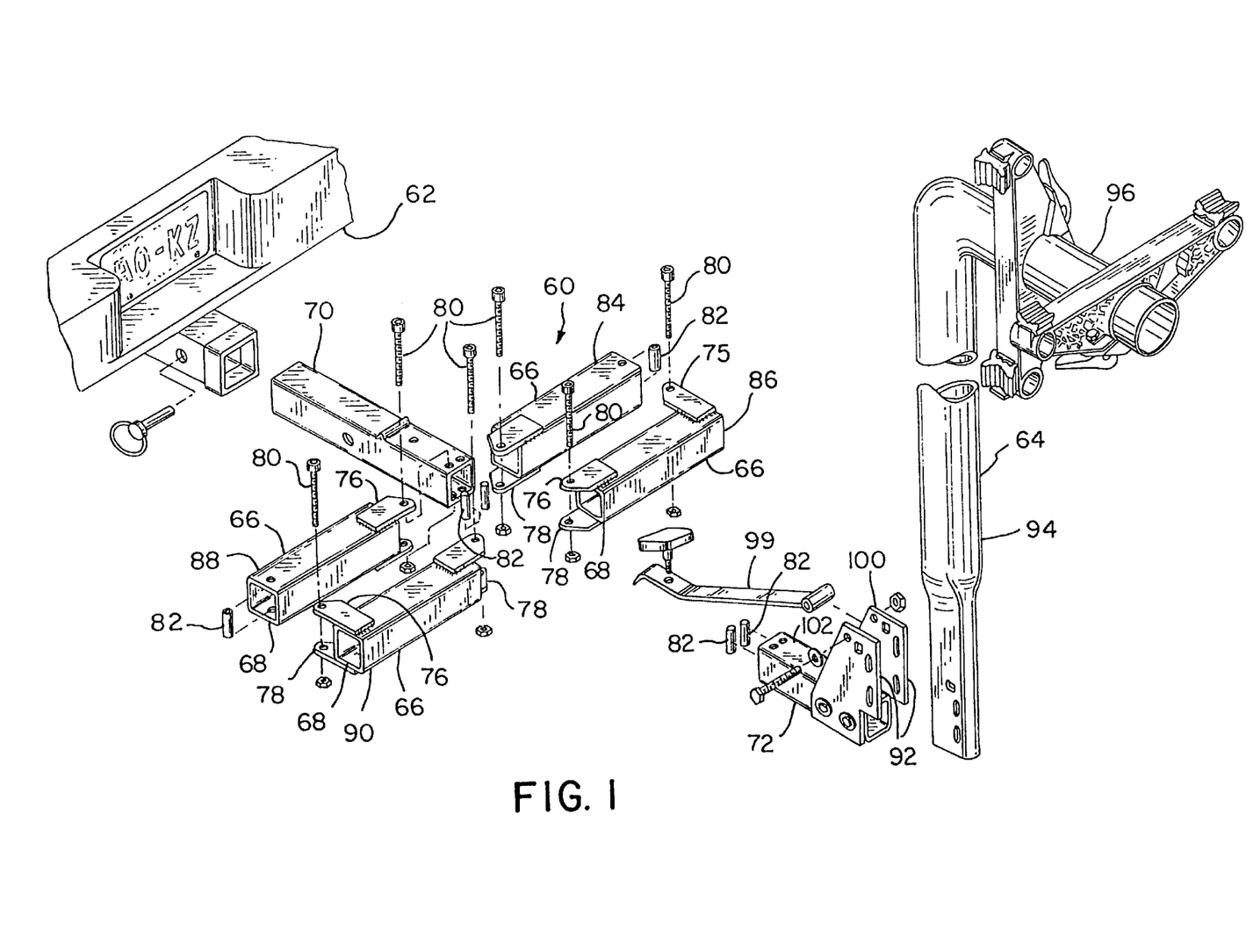
FIG. 1 is an exploded isometric view of the rack extending mechanism of this invention.
Figure 2:
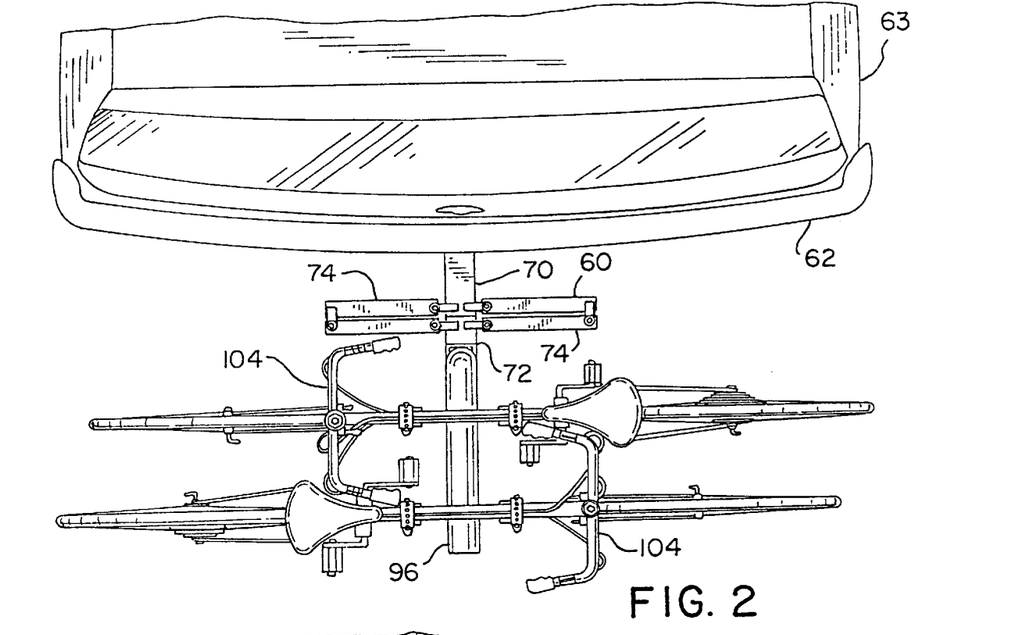
FIG. 2 is a top plan view of the rear of a vehicle showing the rack extending mechanism in its collapsed position.

Another rack extension mechanism 60 of this invention is shown in FIG. 1. The rack extension mechanism is positioned between a rear bumper 62 of a vehicle 63 and a bicycle rack 64. The rack extension mechanism 60 is has arms 66 which are constructed from square tube sections 68 to maximize arm stiffness, in particular torsional stiffness. The rack extension mechanism 60 has a hitch mounting bracket 70 and an equipment mounting bracket 72 which are joined by pairs 74 of arms 66. The six bearings which join the arms 66 to the hitch mounting bracket 70 and the equipment mounting bracket 72 are formed by upper plates 76 and lower plates 78 which extend from the arms 66 to overlap adjacent structural sections. The plates 76, 78 form bearings with bearing bolts 80 and the structural section through which the bolts pass. The structural section through which the bearing is mounted is supported by a bearing sleeve 82.

Figures 3, 4:
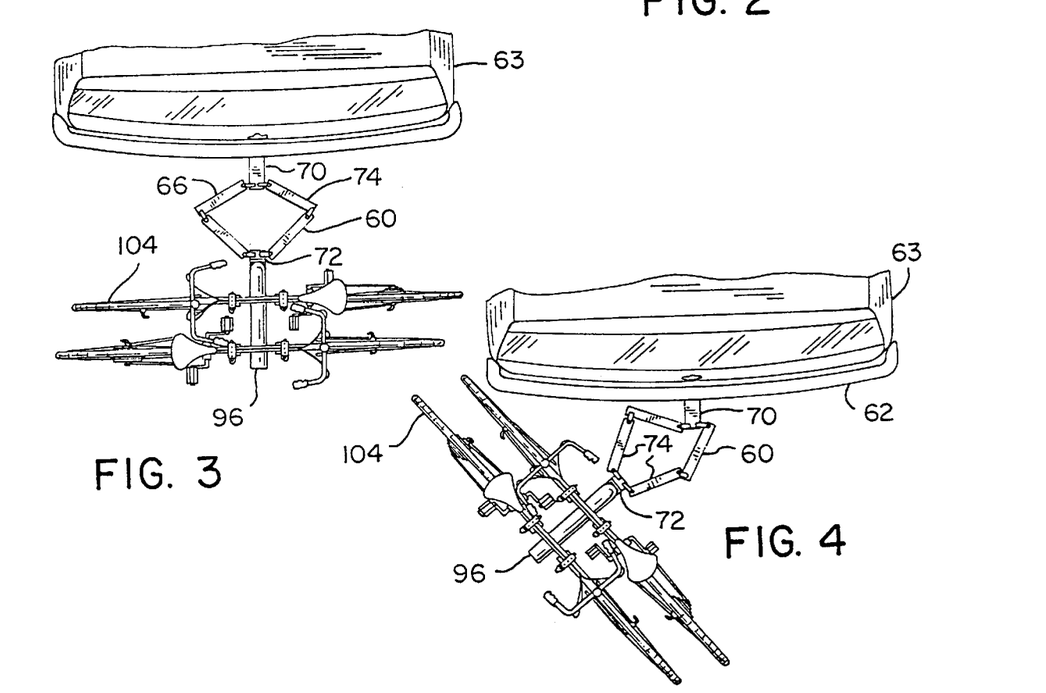
FIG. 3 is a top plan view of the rack mechanism of FIG. 2 partly extended to the rear of the vehicle.
FIG. 4 is a top plan view of the rear of the vehicle showing the rack extending mechanism of FIG. 3 completely extended and rotated to one side of the vehicle.

The rack extension mechanism 60, as shown in FIGS. 1–4, has a first arm 84 which is pinned to the right side of the hitch mounting bracket. When the rack extension 60 is in its retracted position the first arm 84 extends substantially perpendicular to the hitch mounting bracket 70. A second arm 86 has two sets of plates 76, 78. One set extends perpendicular to the second arm 86 to join the second arm to the first arm 84. Another set of plates 76, 78 extends parallel to the second arm 86 and joins the second arm to the equipment support bracket 72. The second arm 86 is substantially parallel to the first arm 84 when the extension mechanism 60 is in its retracted position as shown in FIG. 3. A third arm 88 and fourth arm 90 are arranged opposite and in mirror symmetry to the first and second arms 84, 86.

The bike rack 64 is attached by bolts or pins (not shown) to support flanges 92 which are bolted or welded to the rack mounting bracket 72. The bike rack has a long vertically extending section 94 and a shorter horizontal section 96 to which bike support brackets are mounted.

A fully loaded rack 64 produces a moment arm which acts to twist the arms 66. This moment produced by the weight of the equipment supported on the rack is best countered by a structural connection 99 which is anchored to the hitch mounting bracket 70 and which extends to a point 100 on the equipment support bracket 72 which is elevated above a horizontal plane containing the portion 102 of the equipment support bracket 72 which abuts the hitch mounting bracket 70. The rack extension mechanism 60 not only allows the equipment rack to be extended to the rear of a vehicle but also allows the equipment rack to be rotated about the bearings between the arms and the hitch mounting bracket 70 and the bearings between the arms and the equipment mounting bracket 72.

The balanced nature of the rack extension mechanisms 20, 60 of this invention will generally allow the bike rack 64 or other equipment rack to be positioned, even when loaded, without requiring pins or locking mechanisms.

The rack extension mechanisms 20, 60 will typically provide an extension of the rack mounting bracket 26, 72 of about 16 inches or however much is necessary to allow the rear door or doors of a vehicle to be opened. Thus the individual arms 28, 66 will be about 8 inches long.

The rack extension mechanism 20, 60 will typically be installed in a rear trailer hitch in a collapsed and lock condition. Bikes 104 are then mounted to the rack 64. If access to the rear of the vehicle 63 is desired the structural connection 99 is unlocked releasing the equipment mounting bracket 72 from the hitch mounting bracket 70. The loaded rack 64 may then be pulled to the rear and/or to the side of the vehicle 63 as shown in FIGS. 3 and 4. The unique construction of the extension mechanism 20, 60 with the pairs of linked arms results in a stiff structure which deflects little under the load of the bikes 104, is compact when collapsed, and allows placement of the bikes anyway within a circle defined by the link arms.

Figure 7:
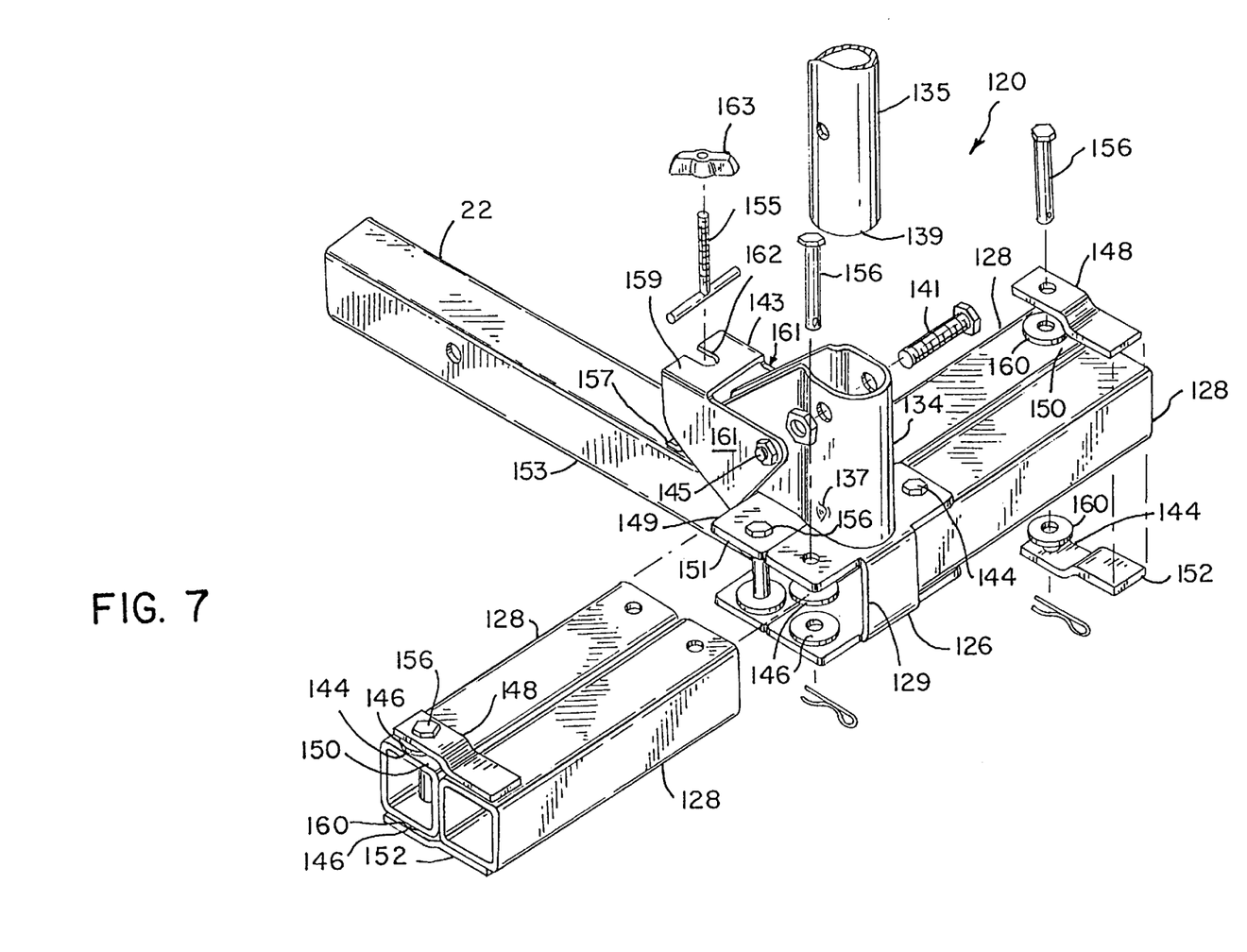
FIG. 7 is a partly exploded isometric view of an alternative rack extending mechanism of invention.

A further embodiment rack extension mechanism 120 is shown in FIG. 7. The extension mechanism 120 includes a hitch attachment bracket 122 and a rack mounting bracket 126. Four linked arms 128 connect the hitch attachment bracket 122 to the rack mounting bracket 126 in a manner similar to that employed in the rack extension mechanism 20 shown in FIG. 5 and in the rack extension mechanism 60 shown in FIGS. 1–4.

The rack mounting bracket 126 incorporates a metal stamping 129 which is welded to a bracket 134 to which an equipment carrying rack 135 is connected. The bracket 129 forms a first and a second spaced apart pivot attachment portions through which bearing pins 156 may be placed to connect arms 128. The bracket wraps around the tubular base of the carrying rack 135. Protrusions 137 extend inwardly from the tubular portion at the bottom 139 of the rack 135 within the bracket 134. A bolt 141 locks the rack 135 to the bracket 134.

Figure 8:
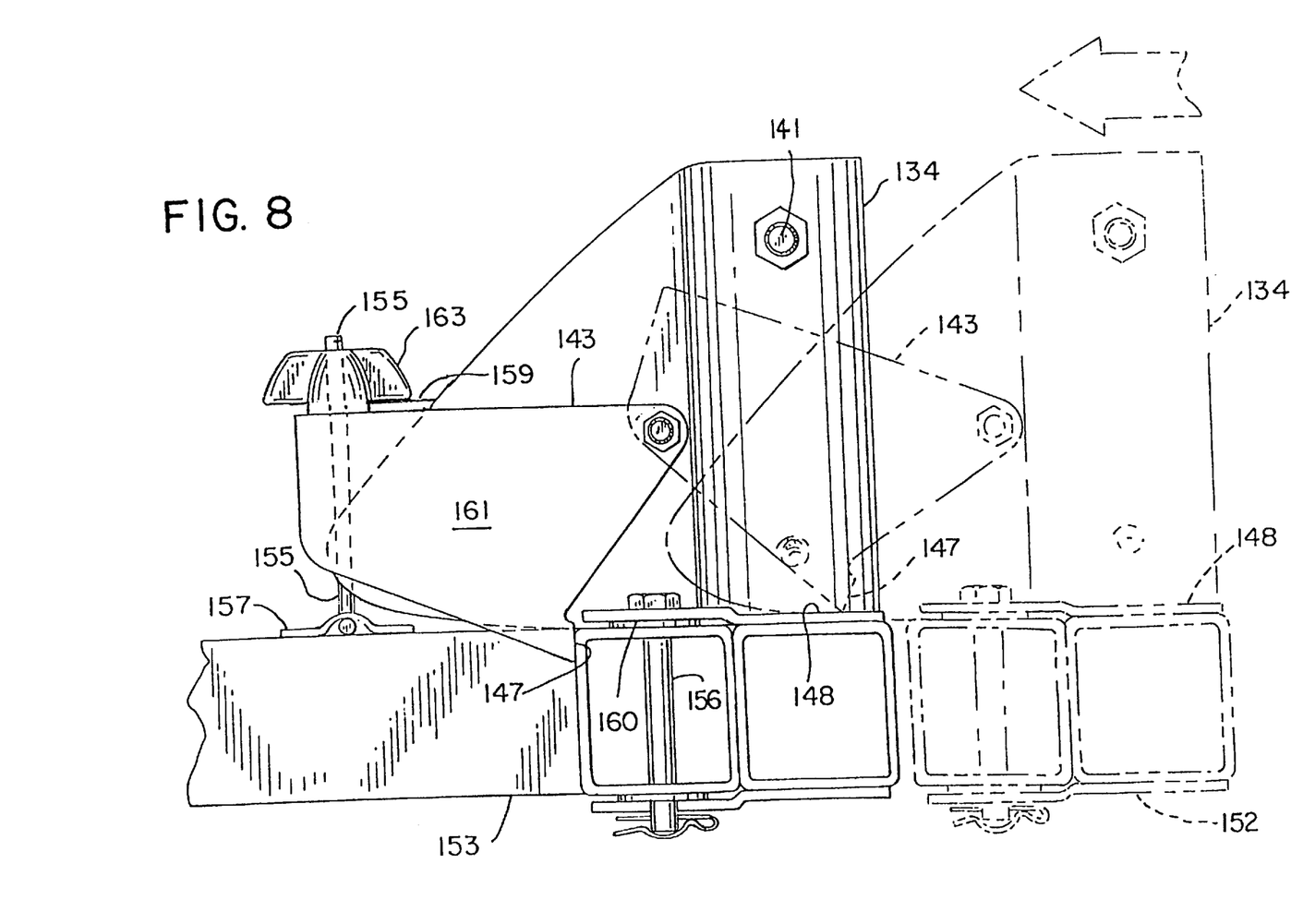
FIG. 8 is a side elevational view of the rack extending mechanism of FIG. 7 showing motion of the mechanism as it moves towards a locked position.

A locking hasp 143 is pivotally mounted by a bolt 145 to the bracket 134. The locking hasp 143 has a catch surface 147 which engages the back side 149 of a second metal stamping 151 which is welded to the square tube section 153 of the hitch attachment bracket 122. The metal stamping 151 is identical to the metal stamping 129 and likewise forms a first and a second spaced apart pivot attachment portions through which bearing pins 156 may be placed to connect arms 128. As shown in FIG. 8, collapsing the rack extension mechanism 120 brings the rack mounting bracket 126 into juxtaposition with the hitch attachment bracket 122, with the result that the hasp 143 slides over the top of the metal stamping 129. The weight of the hasp 143 latches the rack mounting bracket 126 to the hitch attachment bracket 122. A secondary latch is formed by a T-bolt 155 which is attached to the tube section 153 by a metal strap 157. The T-bolt passes through a slot 162 in an upwardly facing flange 159 which connects the sides 161 of the hasp 143. A handle 163 is threaded onto the T-bolt and engages the flange 159 to draw the flange towards the tubular section 153. The bolt 145 acts as a fulcrum and the upwardly facing flange 159 acts as a lever arm which applies mechanical advantage to the catch surfaces 147 which draws the metal structures 129, 157 together.

A load path which extends from a portion of the rack mounting bracket above the plane containing the arms 128 and extending downward to the tube section 153 where the metal strap 157 is mounted, provides a means to counteract the bending loads imposed on the rack extension mechanism 120 by the weight of bikes or other equipment which is attached to the equipment carrying rack 135.

The arms 128 are formed of structural steel square section in order to provide torsional and bending stiffness to support the weight of bikes or other equipment which is mounted to the equipment carrying rack 135.

Bearing mechanisms 144, best shown in FIG. 7, provide for rotation of the arms 128 with respect to each other and the hitch mounting bracket 122 and the rack mounting bracket 126. Each bearing mechanism 144 incorporates two bearings 146 formed between upper bearing extension plates 148 and upper surfaces 150 of the square arm sections and lower bearing plates 152 and lower surfaces 154 of the square section. The bearing plates 148, 152 may be formed as metal stampings and are welded to the arms 128 which do not receive the pins 156. Washers 160, which are constructed of low friction material such as TEFLON® plastic or other plastic, or sintered metal are positioned between the extension plates 148, 152 and the upper surfaces 150 to reduce bearing friction. One or two washers may be used to form each bearing 146.

The vertically arrayed bearings 146 form a bearing axis coincident with the bearing pins 156 which join the arms 128 to each other and the hitch mounting bracket 122 and the rack mounting bracket 126. Bolt sleeves are not necessary if the joints between the arms are pinned together as shown in FIG. 7.

It should be understood that the arms 28, 66, 128 can be constructed of any structural section such as a I-beam, Square section, or C-channel, which has a cross-section with a high moment of inertia relative to the section weight so that on a pound to pound comparison the structural member has a high bending and torsional stiffness. Simple solid structural sections such as bars have insufficient bending stiffness or too high a sectional weight.

It is understood that the invention is not limited to the particular construction and arrangement of parts herein illustrated and described, but embraces such modified forms thereof as come within the scope of the following claims.

We claim:

1. A mechanism for mounting to a rearwardly extending vehicle trailer hitch, the mechanism comprising:
   a hitch attachment bracket for mounting to a vehicle trailer hitch;
   an equipment rack mounting bracket;
   a first arm formed of a structural section, and having a first end and a second end, the first arm being pivotally mounted at the first end to the hitch attachment bracket by at least two bearings which define a first vertical axis;
   a second arm formed of a structural section, the second arm having a first end and a second end, the first end of the second arm being pivotally mounted to the second end of the first arm by at least two bearings which define a second vertical axis parallel to the first vertical axis, the second end of the second arm being pivotally mounted to the equipment rack mounting bracket by at least two bearings which define a third vertical axis which is parallel to the first vertical axis;
   a third arm formed of a structural section, and having a first end and a second end, the third arm being pivotally mounted at the first end to the hitch attachment bracket by at least two bearings which define a fourth vertical axis;
   a fourth arm formed of a structural section and having a first end and a second end, the first end of the fourth arm being pivotally mounted to the second end of the third arm by at least two bearings which define a fifth vertical axis parallel to the first vertical axis, the second end of the fourth arm being pivotally mounted to the equipment rack mounting bracket by at least two bearings which define a sixth vertical axis parallel to the first vertical axis;
   lock extending between the a hitch attachment bracket and the equipment rack mounting bracket when the hitch attachment bracket and equipment rack mounting bracket are in juxtaposition.

2. The apparatus of claim 1 wherein the lock is anchored to the hitch attachment bracket and extends to a point on the equipment rack mounting bracket which is elevated above a horizontal plane containing a portion of the equipment rack mounting bracket which abuts the hitch attachment bracket.

3. The apparatus of claim 1 wherein the structural sections making up the first, second, third and fourth arms have a C-shaped cross-section.

4. The apparatus of claim 1 wherein the structural sections making up the first, second, third, and fourth arms have a rectangular cross-section.

5. The apparatus of claim 1 further comprising a locking hasp pivotally mounted to the equipment rack mounting bracket so that gravity acting on the hasp causes a portion of the hasp to engage a portion of the hitch attachment bracket.

6. The apparatus of claim 5 further comprising a bolt extending between the hasp and the hitch attachment bracket to fixedly engage the hasp with the hitch attachment bracket.

7. The apparatus of claim 5 wherein the hasp forms a lever for pulling the equipment mounting bracket into close proximity with the hitch attachment bracket.

8. A mechanism for mounting an equipment rack to a rearwardly extending vehicle trailer hitch, the mechanism comprising:

a hitch attachment bracket for mounting to a vehicle trailer hitch;

an equipment rack mounting bracket;

a first arm formed of a structural section, and having a first end and a second end, the first arm being pivotally mounted at the first end to the hitch attachment bracket by a bearing mechanism which defines a first vertical axis;

a second arm formed of a structural section, the second arm having a first end and a second end, the first end of the second arm being pivotally mounted to the second end of the first arm by a bearing mechanism which defines a second vertical axis parallel to the first vertical axis, the second end of the second arm being pivotally mounted to the equipment rack mounting bracket by a bearing mechanism which defines a third vertical axis which is parallel to the first vertical axis;

a third arm formed of a structural section, and having a first end and a second end, the third arm being pivotally mounted at the first end to the hitch attachment bracket by a bearing mechanism which defines a fourth vertical axis;

a fourth arm formed of a structural section and having a first end and a second end, the first end of the fourth arm being pivotally mounted to the second end of the third arm by a bearing mechanism which defines a fifth vertical axis parallel to the first vertical axis, the second end of the fourth arm being pivotally mounted to the equipment rack mounting bracket by a bearing mechanism which defines a sixth vertical axis parallel to the first vertical axis;

a lock extending between the a hitch attachment bracket and the equipment rack mounting bracket when the hitch attachment bracket and the equipment rack mounting bracket are in juxtaposition.

9. The apparatus of claim 8 wherein the lock is anchored to the hitch attachment bracket and extends to a point on the equipment rack mounting bracket which is elevated above a horizontal plane containing a portion of the equipment rack mounting bracket which abuts the hitch attachment bracket.

10. The apparatus of claim 8 wherein the structural sections making up the first, second, third and fourth arms have a C-shaped cross-section.

11. The apparatus of claim 8 wherein the structural sections making up the first, second, third, and fourth arms have a rectangular cross-section.

12. The apparatus of claim 8 wherein the bearings defining the first, second, third, fourth, fifth, and sixth axes are formed by upper plates and lower plates which extend from the arms to overlap adjacent structural sections, the plates forming bearings mechanism with the structural section which they overlie.

13. The apparatus of claim 8 further comprising a locking hasp pivotally mounted to the equipment mounting bracket so that gravity acting on the hasp causes a portion of the hasp to engage a portion of the hitch attachment bracket.

14. The apparatus of claim 13 further comprising a bolt extending between the hasp and the hitch attachment bracket to fixedly engaged the hasp with the hitch attachment bracket.

15. The apparatus of claim 13 wherein the hasp forms a lever for pulling the equipment mounting bracket into close proximity with the hitch attachment bracket.

16. A mechanism for mounting an equipment rack to a rearwardly extending vehicle trailer hitch, the mechanism comprising:

a hitch attachment bracket for mounting to a vehicle trailer hitch having a rearwardly extending structural section and a first and a second spaced apart pivot attachment portion;

an equipment rack mounting bracket having a forwardly extending structural section and a first and a second spaced apart pivot attachment portion;

a first arm formed of a structural section, and having a first end and a second end, the first arm being pivotally mounted at the first end to the hitch attachment bracket first pivot attachment portion by a bearing mechanism which defines a first vertical axis;

a second arm formed of a structural section, the second arm having a first end and a second end, the first end of the second arm being pivotally mounted to the second end of the first arm by a bearing mechanism which defines a second vertical axis parallel to the first vertical axis, the second end of the second arm being pivotally mounted to the equipment rack mounting bracket first pivot attachment portion by a bearing mechanism which defines a third vertical axis which is parallel to the first vertical axis;

a third arm formed of a structural section, and having a first end and a second end, the third arm being pivotally mounted at the first end to the hitch attachment bracket second pivot attachment portion, by a bearing mechanism which defines a fourth vertical axis;

a fourth arm formed of a structural section and having a first end and a second end, the first end of the fourth arm being pivotally mounted to the second end of the third arm by a bearing mechanism which defines a fifth vertical axis parallel to the first vertical axis, the second end of the fourth arm being pivotally mounted to the equipment rack mounting bracket second attachment portion by a bearing mechanism which defines a sixth vertical axis parallel to the first vertical axis;

a lock extending between the a hitch attachment bracket and the equipment rack mounting bracket when the hitch attachment bracket and the equipment rack mounting bracket are in juxtaposition.

17. The apparatus of claim 16 wherein the lock is anchored to the hitch mounting bracket and extends to a point on the equipment support bracket which is elevated above a horizontal plane containing a portion of the equipment support bracket which abuts the hitch mounting bracket.

18. The apparatus of claim 16 further comprising a locking hasp pivotally mounted to the equipment mounting bracket so that gravity acting on the hasp causes a portion of the hasp to engage a portion of the hitch attachment bracket.

19. The apparatus of claim 1 wherein the structural sections making up the first, second, third and fourth arms have a C-shaped cross-section.

20. The apparatus of claim 1 wherein the structural sections making up the first, second, third, and fourth arms have a rectangular cross-section.

* * * * *

UNITED STATES PATENT AND TRADEMARK OFFICE
CERTIFICATE OF CORRECTION

PATENT NO.   : 6,085,954
DATED        : July 11, 2000
INVENTOR(S)  : John M. Bloemer et al.

It is certified that error appears in the above-identified patent and that said Letters Patent is hereby corrected as shown below:

Claim 1, column 6,
Line 44, before "lock" insert -- a --; after "between" delete "a";

Claim 8, column 7,
Line 35, after "the" delete "a";

Claim 14, column 7,
Line 61, delete "engaged" and substitute therefor -- engage --;

Claim 16, column 8,
Line 43, after "the" delete "a" (second occurrence)

Signed and Sealed this

Eleventh Day of September, 2001

Attest:

NICHOLAS P. GODICI
Attesting Officer    Acting Director of the United States Patent and Trademark Office